(12) United States Patent
Tjostheim

(10) Patent No.: US 12,121,013 B2
(45) Date of Patent: Oct. 22, 2024

(54) BAIT STORAGE AND DISPENSING DEVICE

(71) Applicant: Jon Ernest Tjostheim, Fort (CA)

(72) Inventor: Jon Ernest Tjostheim, Fort (CA)

( * ) Notice: Subject to any disclaimer, the term of this patent is extended or adjusted under 35 U.S.C. 154(b) by 10 days.

(21) Appl. No.: 18/133,321

(22) Filed: Apr. 11, 2023

(65) Prior Publication Data
US 2023/0329207 A1    Oct. 19, 2023

Related U.S. Application Data

(60) Provisional application No. 63/330,734, filed on Apr. 13, 2022.

(51) Int. Cl.
*A01K 97/04* (2006.01)

(52) U.S. Cl.
CPC .................... *A01K 97/04* (2013.01)

(58) Field of Classification Search
CPC ................. A01K 97/04; A01K 97/06
See application file for complete search history.

(56) References Cited

U.S. PATENT DOCUMENTS

| | | | | |
|---|---|---|---|---|
| 2,156,740 A * | 5/1939 | Schweigert | ............ | A01K 97/06 43/57.1 |
| 3,091,364 A * | 5/1963 | Ayres | ..................... | A01K 97/04 221/256 |
| 3,130,852 A * | 4/1964 | Cook | ..................... | A01K 97/04 220/378 |
| 3,199,245 A * | 8/1965 | Wenting | ................. | A01K 97/04 119/6.7 |
| 5,586,406 A * | 12/1996 | Lin | ........................ | A01K 97/04 43/56 |
| 6,193,902 B1 * | 2/2001 | Eguchi | .................... | A01K 97/04 119/201 |
| 6,651,377 B1 * | 11/2003 | Pleasants | ............... | A01K 97/04 43/55 |
| 6,877,269 B2 * | 4/2005 | Schultz | .................. | A01K 97/04 43/55 |
| 8,327,576 B2 * | 12/2012 | Sellers | ................... | A01K 97/04 220/560 |
| 9,883,665 B2 * | 2/2018 | Heaton | .................. | A01K 97/04 |
| 10,299,468 B2 * | 5/2019 | Aston | .................... | A01K 83/00 |
| 11,206,822 B2 * | 12/2021 | Aston | .................... | A01K 97/06 |
| 11,634,270 B2 * | 4/2023 | Whalen | .................. | B65D 85/20 206/372 |
| 2001/0013588 A1 * | 8/2001 | Eguchi | .................... | A01K 63/02 119/201 |
| 2004/0172875 A1 * | 9/2004 | Schultz | ................. | A01K 97/04 43/55 |
| 2008/0190010 A1 * | 8/2008 | Neal | ....................... | A01K 97/04 43/55 |
| 2011/0119986 A1 * | 5/2011 | Sellers | .................. | A01K 97/04 206/315.11 |

(Continued)

*Primary Examiner* — Jessica B Wong
(74) *Attorney, Agent, or Firm* — CAPEHART LAW FIRM

(57) ABSTRACT

A portable fishing bait case is disclosed herein. The portable fishing bait case includes a housing, a bait screen and a bait dispenser. The bait screen is located within an interior of the housing between a top section and a bottom section of the interior. Once bait is poured into the top section of the interior, the bait is filtered through the bait screen, being separated from bedding material and filtering into the bottom section of the interior. The 'filtered bait' is then selectively dispensed by a user via the bait dispenser.

20 Claims, 8 Drawing Sheets

(56) References Cited

U.S. PATENT DOCUMENTS

| | | | |
|---|---|---|---|
| 2014/0083881 A1* | 3/2014 | Oberacker | A01K 97/06 206/315.11 |
| 2016/0015017 A1* | 1/2016 | Heaton | A01K 97/06 43/54.1 |
| 2016/0143261 A1* | 5/2016 | Oberacker | B65B 63/04 53/430 |
| 2017/0362017 A1* | 12/2017 | Whalen | A01K 97/06 |
| 2018/0042209 A1* | 2/2018 | Aston | A01K 83/00 |
| 2019/0059348 A1* | 2/2019 | Aston | A01K 97/06 |
| 2020/0045950 A1* | 2/2020 | Aston | A01K 97/06 |
| 2020/0352150 A1* | 11/2020 | Whalen | B65D 25/06 |
| 2021/0153488 A1* | 5/2021 | White | A01K 97/06 |
| 2023/0329207 A1* | 10/2023 | Tjostheim | A01K 97/04 |

\* cited by examiner

BAIT STORAGE AND DISPENSING DEVICE

CROSS-REFERENCE TO RELATED APPLICATION

The present application is related to and claims priority to U.S. Provisional Patent Application No. 63/330,734 filed Apr. 13, 2022, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of fishing accessories of existing art and more specifically relates to a portable fishing bait case.

RELATED ART

Fishing is the activity of trying to catch fish and is performed around the world for a variety of reasons, such as for recreational purposes, commercial purposes, competitive purposes, etc. Typically, bait is used to attract fish. Examples of bait used include maggots, worms, artificial soft bait and any other small insects. Generally, this bait is kept and transported in containers with bait bedding—used to keep the bait alive, well flavored and colored for attracting fish. Separating the fishing bait from the bedding material can be a delicate process that requires some care and attention. One of the main challenges is to avoid damaging or crushing the bait while removing it from the bedding material. This can be particularly tricky if the bait is small or fragile, such as worms or maggots.

In addition to this, there are problems with current containers used to transport and store bait. For example, existing containers are often bulky and difficult to transport. In another example, some existing containers are not airtight or water resistant, which not only exposes the bait to the elements (potentially affecting the freshness of the bait), but also leaves the potential for the bait to escape. Thus, a suitable solution is needed.

SUMMARY OF THE INVENTION

In view of the foregoing disadvantages inherent in the known bait storage art, the present disclosure provides a novel bait storage and dispensing device. The general purpose of the present disclosure, which will be described subsequently in greater detail, is to provide a portable, compact case that is used to separate fishing bait from bedding material and to easily dispense the fishing bait when needed.

A portable fishing bait case is disclosed herein. According to some embodiments, the portable fishing bait case may include a housing, a bait screen and a bait dispenser. The housing may include a front portion and a rear portion defining an interior, and at least one fastener to selectively secure the front portion and the rear portion together. The bait screen may be located within the interior of the housing and separate the interior into generally a top section and a bottom section. The bait screen may include a plurality of bait apertures sized to allow bait to pass therethrough whilst substantially preventing bedding material from passing therethrough, thereby causing the bait to separate from the bedding material and filter from the top section to the bottom section of the interior. The bait dispenser may be disposed in one of the front portion or the rear portion toward a bottom of the housing. The bait dispenser may include an opening providing access into the bottom section of the interior, and a door selectively covering the opening. The bait dispenser may enable retrieval of 'filtered bait'.

According to some other embodiments, the portable fishing bait case may include a housing, a bait screen and a bait dispenser; the housing having a front portion and a rear portion defining an interior, and at least one fastener to selectively secure the front portion and the rear portion together. At least the front portion of the housing may be substantially transparent. The bait screen may be located within the interior of the housing and separate the interior into generally a top section and a bottom section. The bait screen may include a first horizontal portion, a vertical portion extending upwardly from a rear of the first horizontal portion and perpendicular thereto, a second horizontal portion extending rearwardly from a top of the vertical portion and perpendicular thereto, and a plurality of bait apertures disposed in each of the first horizontal portion, the vertical portion and the second horizontal portion.

The plurality of bait apertures may be sized to allow bait to pass therethrough whilst substantially preventing bedding material from passing therethrough, thereby causing the bait to separate from the bedding material and filter from the top section to the bottom section of the interior. The bait dispenser may be disposed in one of the front portion and the rear portion toward a bottom of the housing. The bait dispenser may include an opening providing access into the bottom section of the interior, and a door selectively covering the opening. The dispenser may enable retrieval of filtered bait.

According to some other embodiments, the portable fishing bait case may include a housing, a bait screen and a bait dispenser. The housing may include a front portion and a rear portion defining an interior, and at least one fastener to selectively secure the front portion and the rear portion together. At least the front portion of the housing may be substantially transparent. The bait screen may be located within the interior of the housing and may separate the interior into generally a top section and a bottom section. The bait screen may include a single horizontal screen and a plurality of bait apertures disposed therein. The single horizontal screen may be substantially equal to a width and a depth of the housing and the plurality of bait apertures may be sized to allow bait to pass therethrough whilst substantially preventing bedding material from passing therethrough, thereby causing the bait to separate from the bedding material and filter from the top section to the bottom section of the interior. The bait dispenser may be disposed in one of the front portion and the rear portion toward a bottom of the housing. The bait dispenser may include an opening providing access into the bottom section of the interior, and a door selectively covering the opening. The bait dispenser may enable retrieval of filtered bait.

For purposes of summarizing the invention, certain aspects, advantages, and novel features of the invention have been described herein. It is to be understood that not necessarily all such advantages may be achieved in accordance with any one particular embodiment of the invention.

Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a fishing bait storage and dispensing device, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a fishing bait case and more particularly to a fishing bait storage and dispensing device. Generally, the fishing bait storage and dispensing device may include a portable case which may be space conscious, airtight to prevent bait from escaping, durable to protect bait from being crushed, and water resistant to protect bait from getting wet or soggy. In some embodiments, the fishing storage and dispensing device may include a compact, hard plastic case with a hinged side, a transparent front, and an internal screen to filter bait from bedding material, separating the bait for quicker and easier access when fishing. The fishing storage and dispensing device may preferably easily dispense the bait without spills and without bedding material being blown away by the wind.

Figure 1:
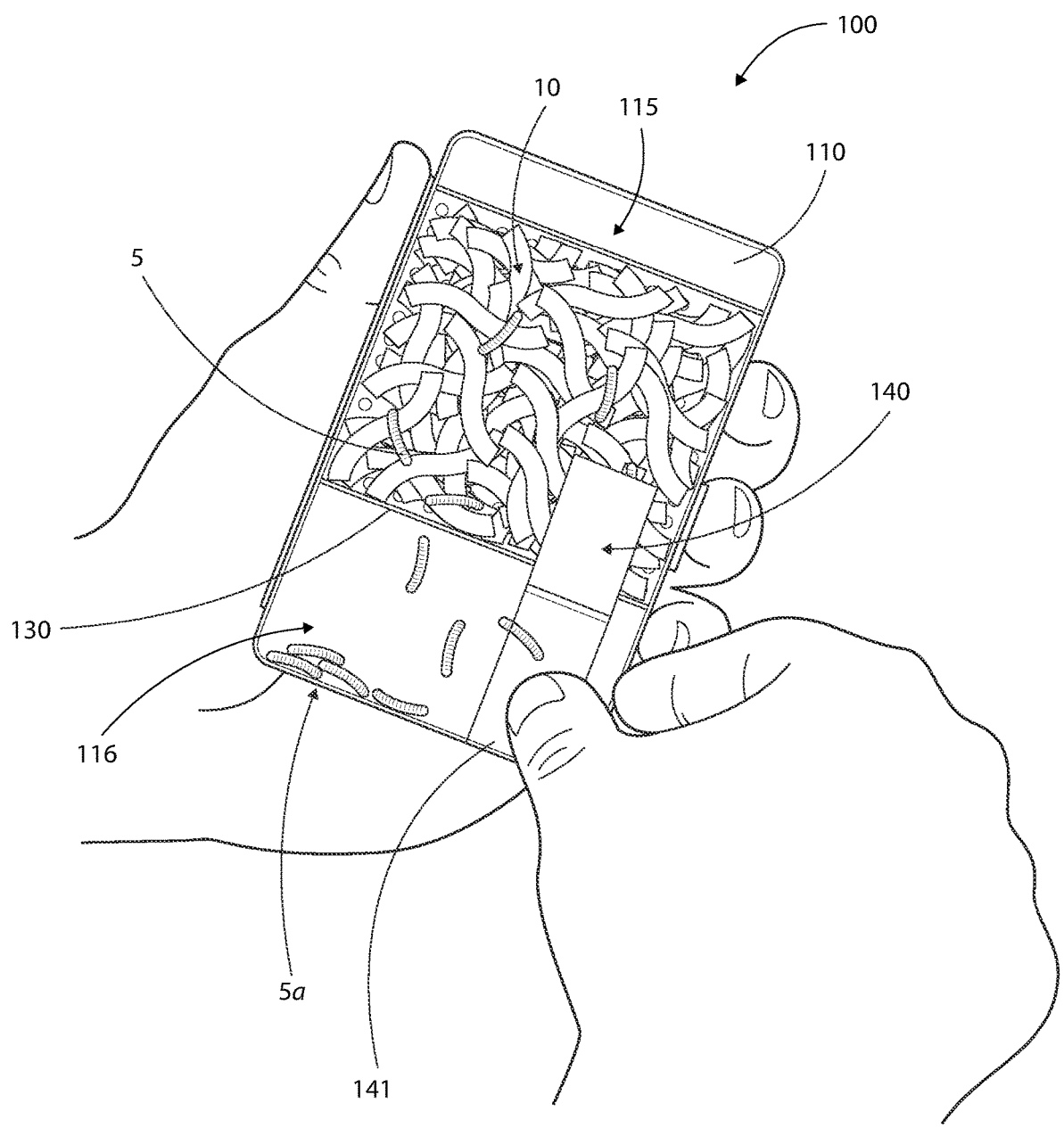
FIG. 1 is a perspective view of a portable fishing bait case being used to store fishing bait such as maggots, separate the fishing bait from bedding material and dispense the fishing bait, according to an embodiment of the disclosure.

Referring now more specifically to the drawings by numerals of reference, there is shown in FIGS. 1-8, various views of a portable fishing bait case 100. As shown in these figures, the portable fishing bait case 100 may include a housing 110, a bait screen 130 and a bait dispenser 140. As shown in FIG. 1, the portable fishing bait case 100 may be designed particularly for use with bait 5 such as maggots, mealworms, artificial bait and/or other small dry insects.

Figure 2:
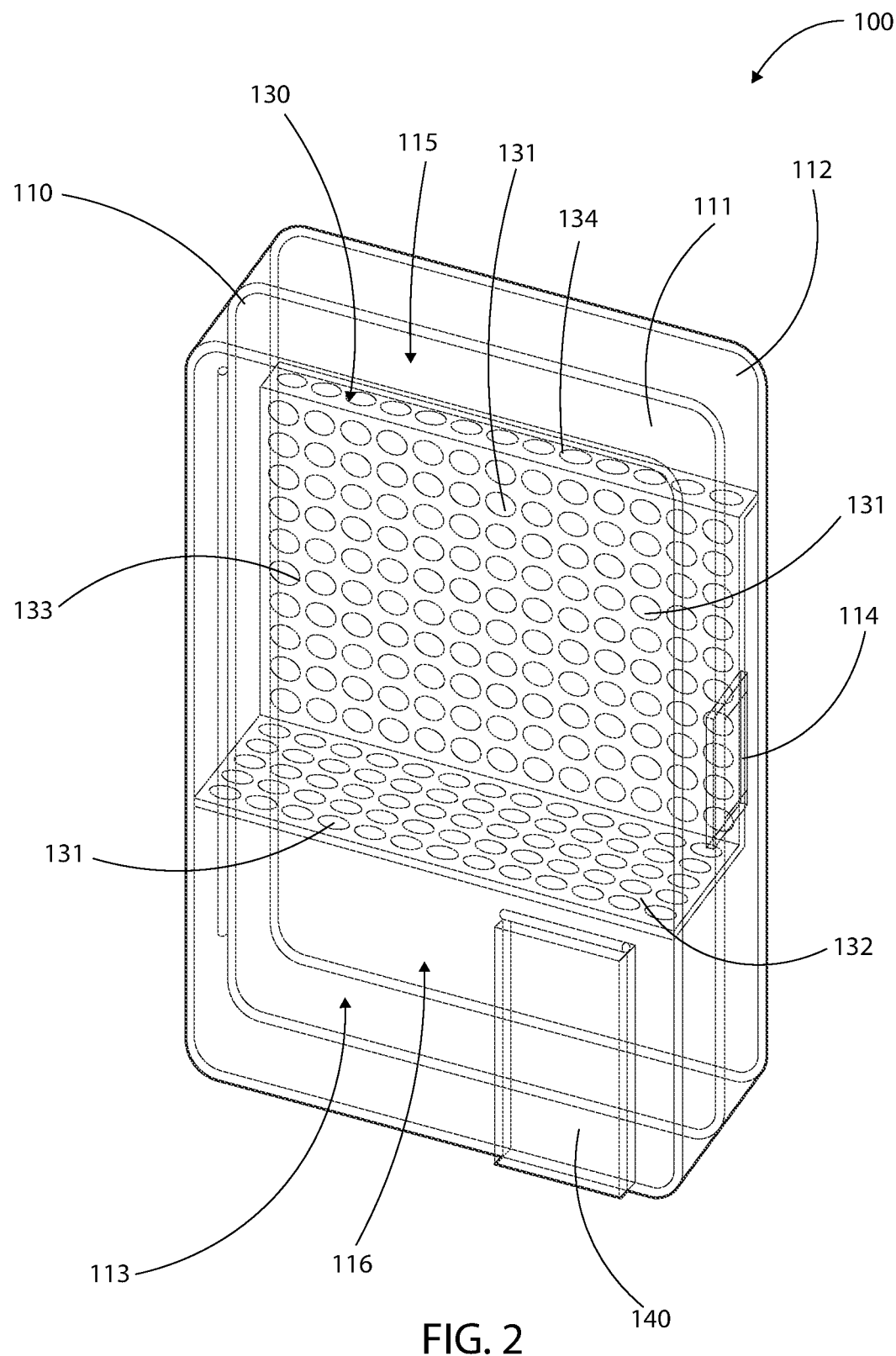
FIG. 2 is a perspective front view of the portable fishing bait case including a 'multi-directional' bait screen, according to an embodiment of the present disclosure.
Figure 3:
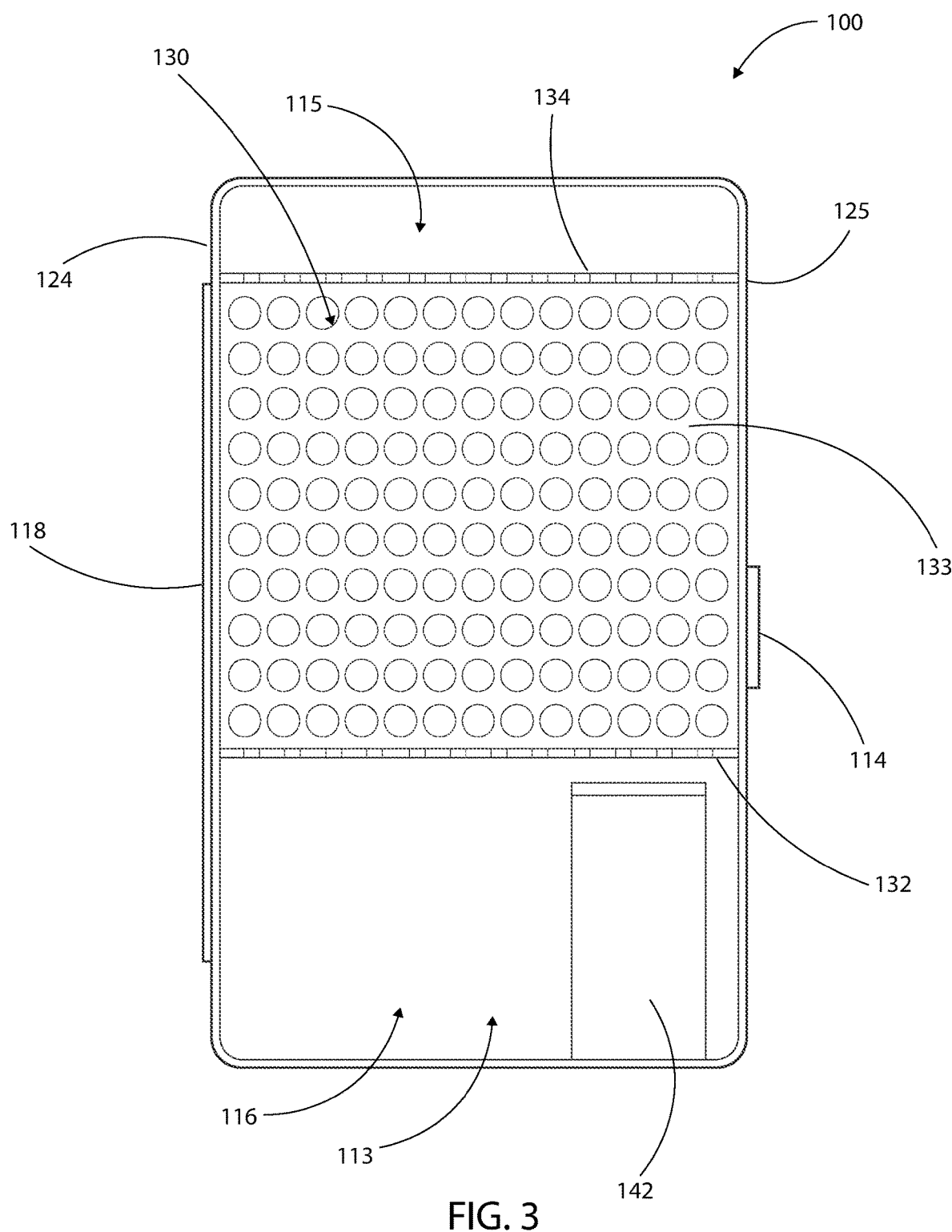
FIG. 3 is a front view of the portable fishing bait case, according to an embodiment of the present disclosure.
Figure 4:
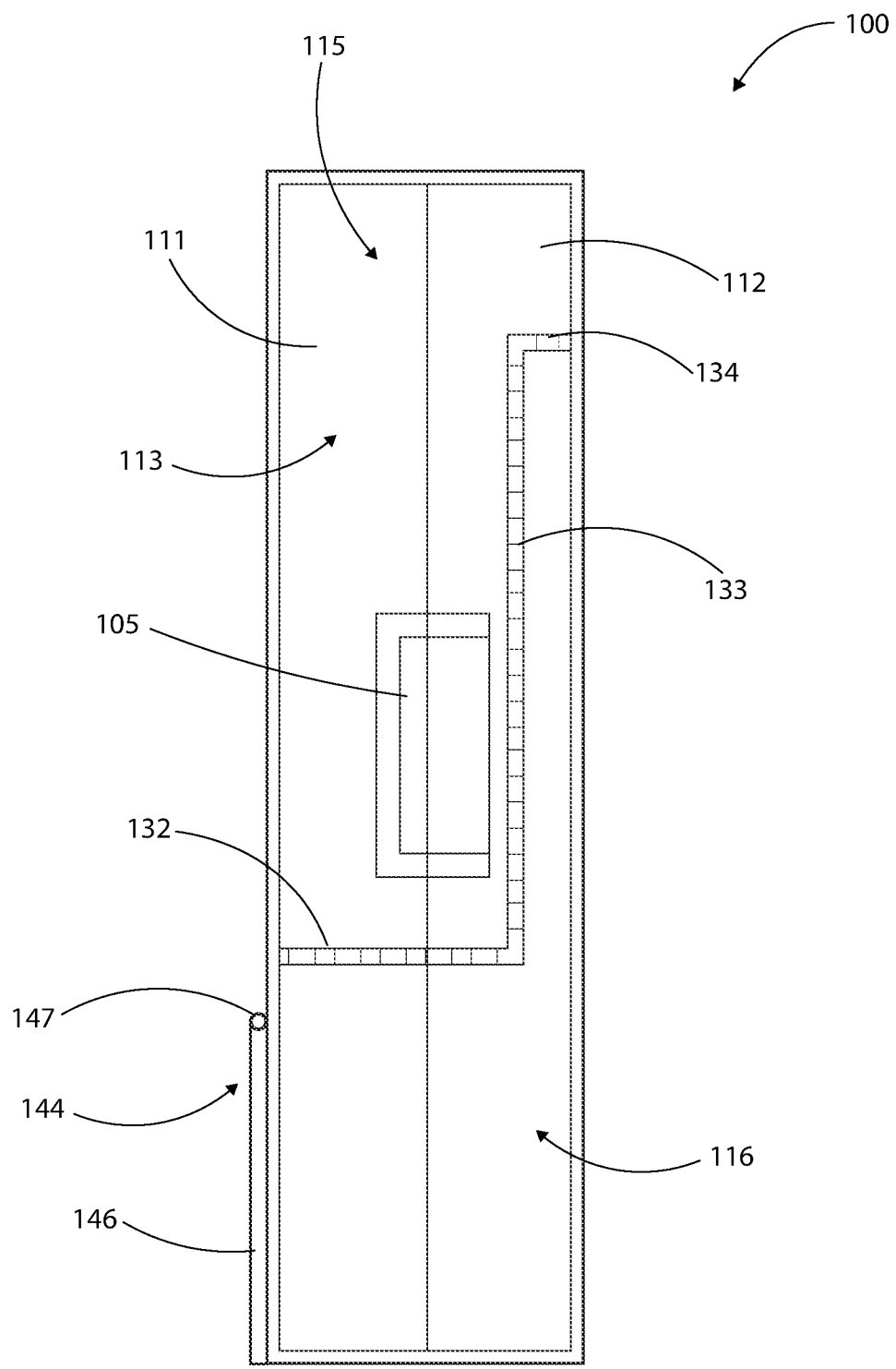
FIG. 4 is a side view of the portable fishing bait case, according to an embodiment of the present disclosure.

Referring to FIGS. 2-4, the housing 110 may include a front portion 111 and a rear portion 112 defining an interior 113, and at least one fastener 114 to selectively secure the front portion 111 and the rear portion 112 together. The at least one fastener 114 may provide an airtight and watertight seal between the front portion 111 and the rear portion 112 so as to prevent the bait 5 from becoming wet and/or soggy, and to prevent inadvertent escape of the bait 5. In some examples, the at least one fastener 114 may include a clasp 105 (FIG. 4). Further, in some embodiments, the housing 110 may further include at least one hinge 118 (FIG. 3) pivotably connecting the front portion 111 and the rear portion 112 at a first side 124 of the housing 110. In this embodiment, the at least one fastener 114 may be located at a second side 125 of the housing 110 (the first side 124 being opposite the second side 125, as shown). Further, the housing 110 may be made from a hard plastic material, providing durability to the housing 110 and preventing the bait 5 stored therewithin from being crushed.

As shown in these figures and as discussed above, the portable fishing bait case 100 may be portable and compact; preferably enabling a user to keep the portable fishing bait case 100 in their pocket for easy access. As such, the housing 110 may include a compact size. For example, as demonstrated in FIG. 5, the housing 110 may include (but is not limited to) a height 211 of 10 cm as measured from a bottom side to a top side thereof; a width 212 of between 6 cm-7 cm, as measured from the first side 124 to the second side 125; and a depth 213 of between 2 cm-4.5 cm, as measured from an exterior surface of the front portion 111 to an exterior surface of the rear portion 112. In some embodiments, the front portion 111 and the rear portion 112 may be equal in depth. In other embodiments, the rear portion 112 may include a larger depth than the front portion 111. Again, it should be appreciated that the housing 110 is not limited to these measurements.

Referring to FIGS. 2-6 in particular, the bait screen 130 may be located within the interior 113 of the housing 110 and may separate the interior 113 into (generally) a top section 115 and a bottom section 116. In some embodiments, the bait screen 130 may be removable from the interior 113. As shown, the bait screen 130 may include a plurality of bait apertures 131 sized to allow bait 5 (FIG. 1) to pass therethrough whilst substantially preventing bedding material 10 (FIG. 1) from passing therethrough, thereby causing the bait 5 to separate from the bedding material 10 and filter from the top section 115 to the bottom section 116 of the interior 113. This filtering may be facilitated at least in part by gravity, in that when the portable fishing bait case 100 is placed upright (with the top section 115 at the top and the bottom section 116 at the bottom), the bait 5 begins to move from the top section 115 to the bottom section 116. As such, the bait 5 and the bedding material 10 may be initially poured into the top section 115 of the housing 110 by the user.

Further, at least the front portion 111 of the housing 110 may be substantially transparent; or, as demonstrated in these figures, the entire housing 110 may be substantially transparent. This may enable the user to view the contents of the housing 110, allowing the user to easily check amount of bait left, health of bait, etc. without having to open the housing 110.

In some embodiments, as demonstrated in FIGS. 2-4, the bait screen 130 may include a 'multi-directional' screen, allowing the bait 5 to filter through to the bottom section 116 at different areas and different angles within the interior 113. For example, as shown, the bait screen 130 may include a first horizontal portion 132, a vertical portion 133 extending upwardly from a rear of the first horizontal portion 132 and perpendicular thereto, and a second horizontal portion 134 extending rearwardly from a top of the vertical portion 133 and perpendicular thereto.

As shown, the plurality of bait apertures 131 may be disposed in each of the first horizontal portion 132, the vertical portion 133 and the second horizontal portion 134. As such the bait 5 may be directed through any of the plurality of bait apertures 131. This configuration may ensure that regardless of whether the housing 110 is upright, the bait 5 is directed into the bottom section 116. For example, the first horizontal portion 132 and the second horizontal portion 134 may capture a majority of the bait 5 when the bait 5 is poured into the top section 115 and the housing 110 is upright. The vertical portion 133 may capture any bait that migrates up from the first horizontal portion 132 or down from the second horizontal portion 134 and/or any bait 5 if the housing 110 is turned causing the vertical portion 133 to be angled or horizontal relative to the user.

Figure 5:
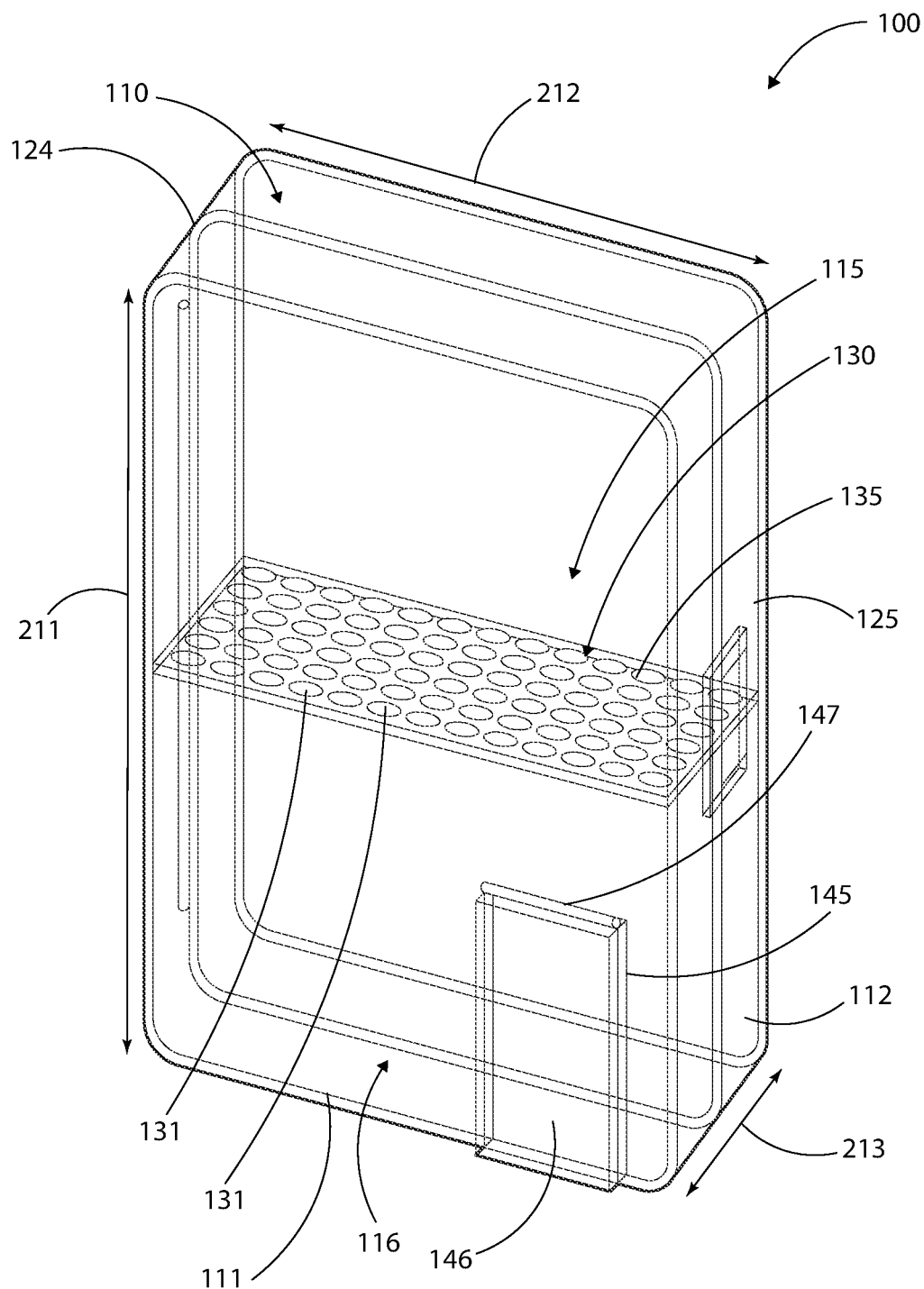
FIG. 5 is a perspective front view of the portable fishing bait case including a single horizontal bait screen, according to an embodiment of the present disclosure.
Figure 6:
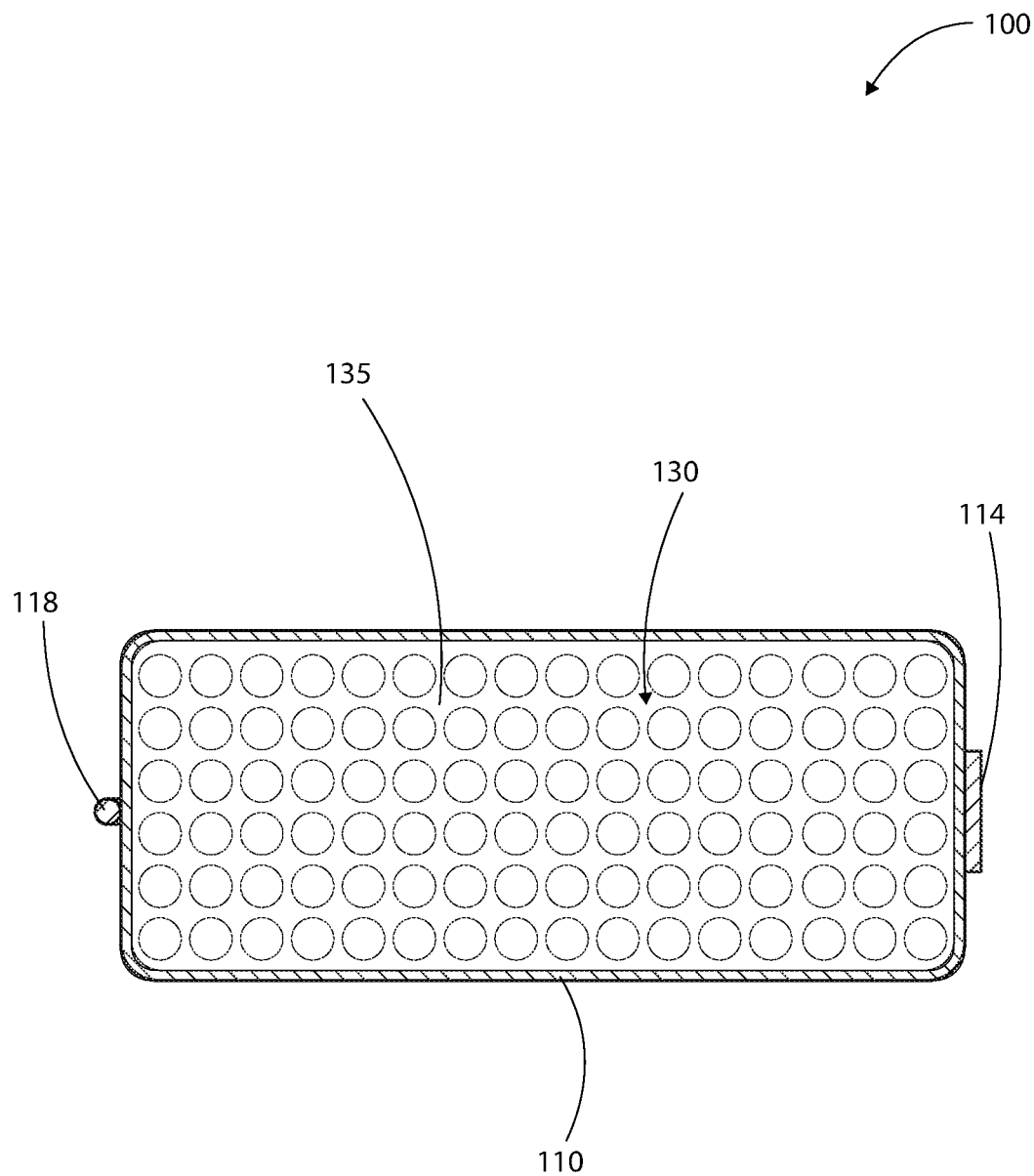
FIG. 6 is a cross-sectional view from a top of the portable fishing bait case and illustrating the single horizontal bait screen, according to an embodiment of the present disclosure.
Figure 7:
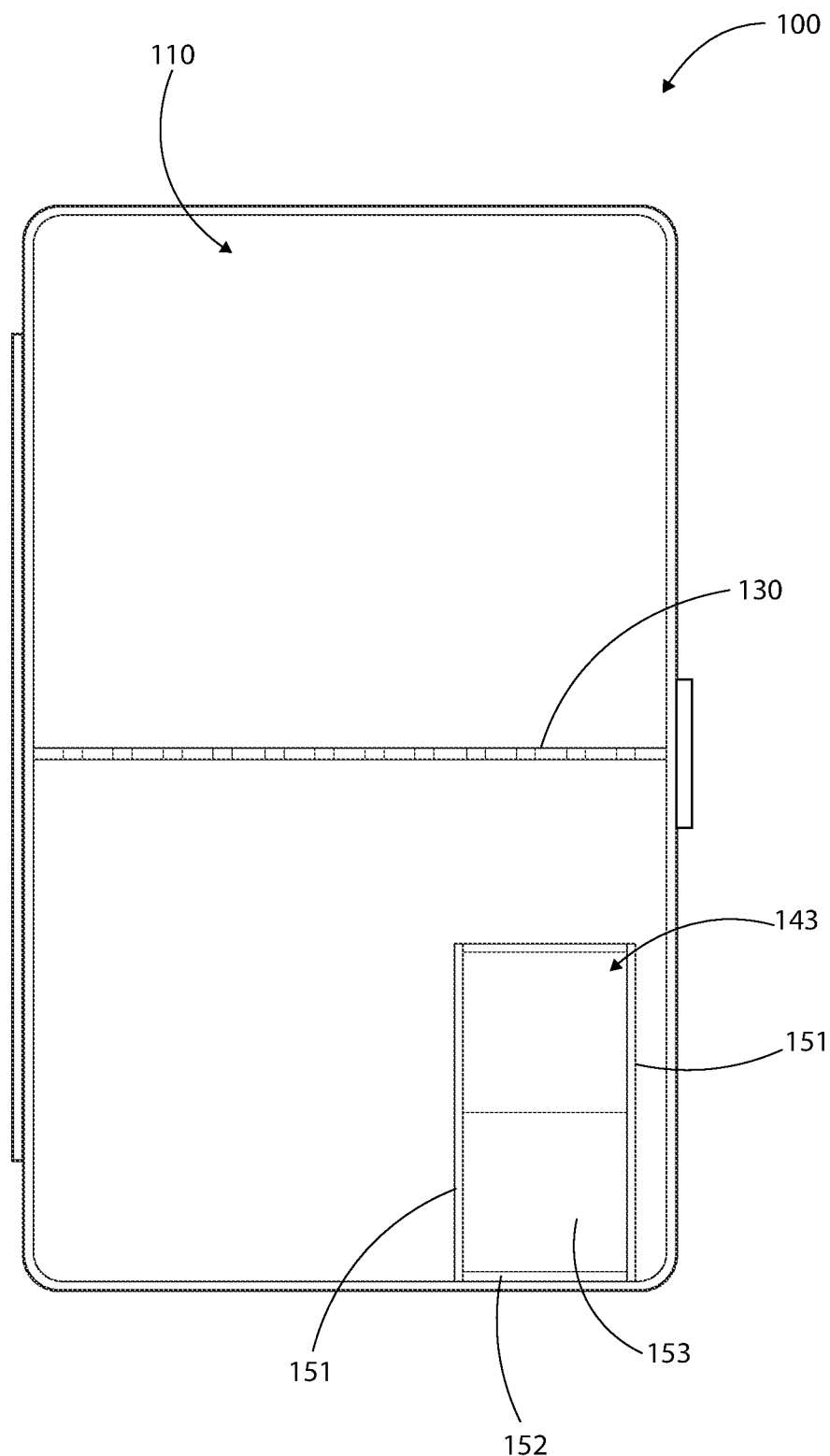
FIG. 7 is a front view of the portable fishing bait case including a slidable door, according to an embodiment of the present disclosure.

In other embodiments, as demonstrated in FIGS. 5-7, the bait screen 130 may include a single horizontal screen 135. The single horizontal screen 135 may be sized substantially equal to the width 212 and the depth 213 of the housing 110, or more particularly, the interior 113 of the housing 110 so that the bait 5 is directed solely through the bait apertures 131 and bedding material 10 is unable to fall into the bottom section 116 through the sides of the bait screen 130. In this embodiment, the user may simply pour the bait 5 into the top section 115 of the interior 113, the bait 5 may collect on the single horizontal screen 135 and then be directed through the plurality of bait apertures 131 into the bottom section 116.

The bait dispenser 140 may be disposed in one of the front portion 111 or the rear portion 112 toward a bottom of the housing 110. For example, as shown in these figures, the bait dispenser 140 may be disposed in the front portion 111. As shown in FIG. 1 in particular, the bait dispenser 140 may enable retrieval of 'filtered bait' 5a (bait 5 that has been separated from the bedding material 10 and filtered into the bottom section 116 of the housing 110). As such, the bait dispenser 140 (FIG. 2) may be disposed in the front portion 111 of the housing 110 at the bottom of the housing 110. The bait dispenser 140 may include an opening 141 (FIG. 1) integral to the front portion 111 of the housing 110 and providing access into the bottom section 116 of the interior 113; and a door 142 (FIG. 3) selectively covering the opening 141.

Referring specifically back to FIGS. 1-5, as shown, the door 142 may be a hinged door 144. For example, as referenced particularly in FIGS. 4-5, the hinged door 144 may include a base panel 145 attached to the housing 110 and framing the opening 141 (FIG. 1); a door panel 146; and a hinge 147 pivotably connecting the door panel 146 to the base panel 145 and enabling the door panel 146 to pivot between an open position (exposing the opening 141 and enabling retrieval of the filtered bait 5a) and a closed position (closing the opening 141 and preventing retrieval/escape of the filtered bait 5a). The hinge 147 may be located at a top of the bait dispenser 140, as shown in FIGS. 4-5, thereby enabling the door panel 146 to open from the bottom.

Figure 8:
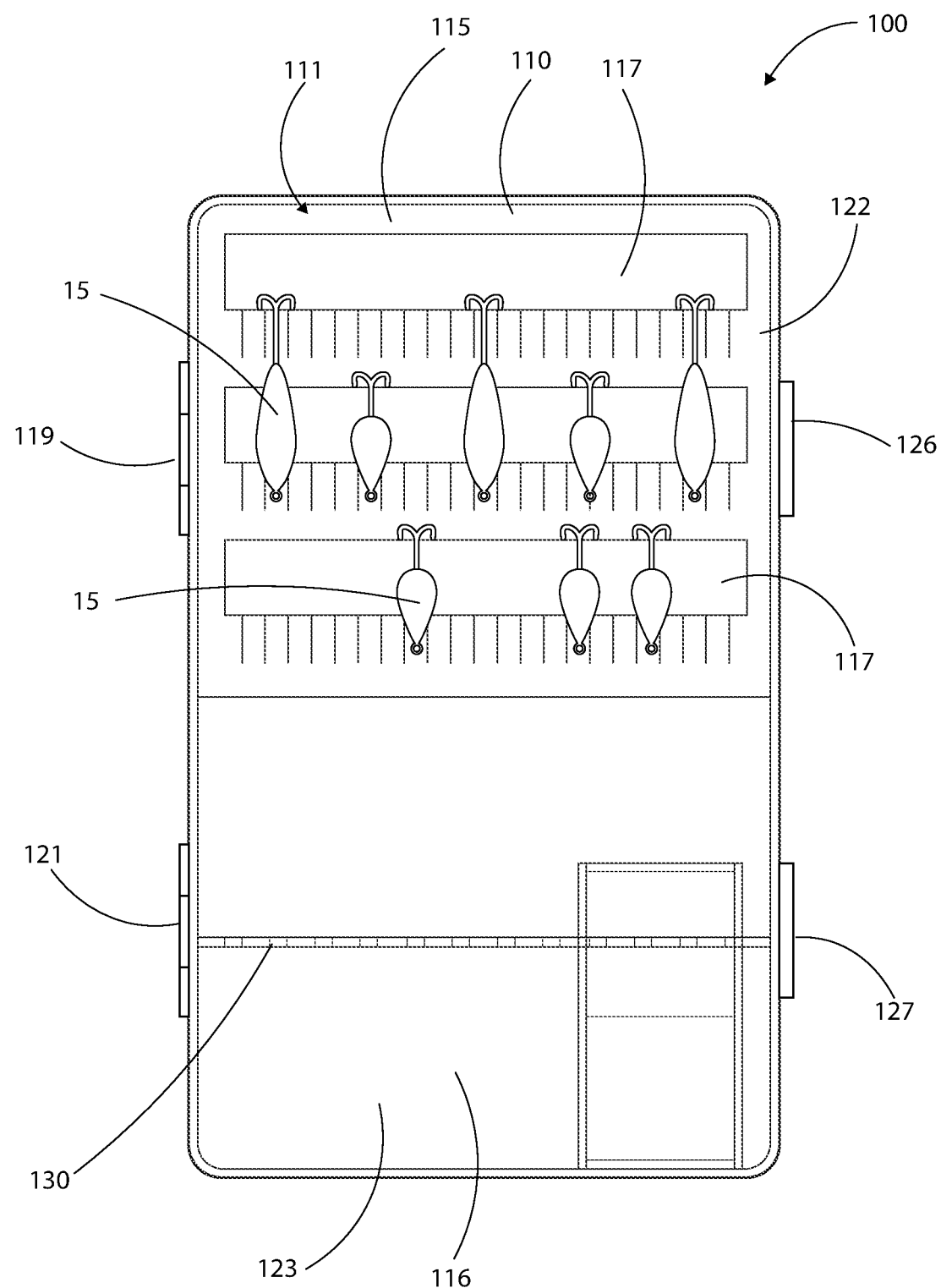
FIG. 8 is a front view of the portable fishing bait case including a plurality of fishing jig holders, according to an embodiment of the present disclosure.

In another embodiment, as demonstrated specifically in FIGS. 7-8, the door 142 may be a slidable door 143. For example, a pair of parallel tracks 151 may be provided, either integral to the housing 110 or attached to a base panel 152, and a door panel 153 may be configured to slide along the pair of parallel tracks 151 from an open position (again, exposing the opening 141 [FIG. 1] and enabling retrieval of the filtered bait 5a) and a closed position (again, closing the opening 141 and preventing retrieval/escape of the filtered bait 5a). It should be appreciated that regardless of type of door 142 utilized, it is contemplated that the door 142 may be easily opened using one hand.

Referring now more specifically to FIG. 8, there is shown the portable fishing bait case 100 according to another embodiment. As shown here, at least the front portion 111 of the housing 110 may be divided into a top half 122 and a bottom half 123. In this embodiment, the at least one hinge 118 (FIG. 3) may include a top hinge 119 connecting the top half 122 to the rear portion 112, and a bottom hinge 121 connecting the bottom half 123 to the rear portion 112. As such, the front half and the bottom half 123 may be separately openable. In this embodiment, the at least one fastener 114 (FIGS. 2-3) may include a top fastener 126 to selectively secure the top half 122 to the rear portion 112 and a bottom fastener 127 to selectively secure the bottom half 123 to the rear portion 112. Again, as discussed above, the fasteners 126, 127 may each include a clasp 105 (FIG. 4).

In this embodiment, as shown in FIG. 8, the top section 115 may include a plurality of fishing jig holders 117. The plurality of fishing jig holders 117 may be accessible via the top half 122 of the front portion 111, enabling the user to access fishing jigs 15 without having to open the bottom section 116 and disturb or risk escape of the filtered bait 5a. In some embodiments, the plurality of fishing jig holders 117 may include foam holders having a plurality of slots, enabling fishing jigs 15 to be hooked into and secured therein. Further, in this embodiment, the bait screen 130 may be located further down the interior 113 than other embodiments discussed above, leaving sufficient room above the bait screen 130 (in the top section 115) for the bait 5 and the bedding material 10 while still leaving sufficient room below the bait screen 130 (in the bottom section 116) for the filtered bait 5a.

In use, a user may pour the bait into the top section 115 of the housing 110. This may be achieved by opening the entire housing 110 (unclasping the entire front portion 111 from the rear portion 112), or in some embodiments, by solely opening the top half 122 of the front portion 111. The user may then close the housing 110 and the bait 5 may begin to filter through the bait screen 130 where it is separated from the bedding material 10. When needed, the user may open the door 142 of the bait dispenser 140 and dispense some of the filtered bait 5a. The user may then close the door 142, securing the remaining filtered bait 5a within the housing 110. In some examples, the door 142 may be opened and closed by pivoting the door panel 146. In other examples, the door 142 may be opened by sliding the door 142 up and down the pair of parallel tracks 151.

It should be noted that certain steps are optional and may not be implemented in all cases. It should also be noted that, under appropriate circumstances, considering such issues as design preference, user preferences, marketing preferences, cost, structural requirements, available materials, technological advances, etc., other methods for storing and dispensing fishing bait are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A portable fishing bait case comprising:
   a housing including a front portion and a rear portion defining an interior, and at least one fastener to selectively secure the front portion and the rear portion together;
   a bait screen located within the interior of the housing and separating the interior into generally a top section and a bottom section, the bait screen including a plurality of bait apertures sized to allow bait to pass therethrough whilst substantially preventing bedding material from passing therethrough, thereby causing the bait to separate from the bedding material and filter from the top section to the bottom section of the interior;
   a bait dispenser disposed in one of the front portion and the rear portion toward a bottom of the housing, the bait dispenser including an opening providing access into the bottom section of the interior, and a door selectively covering the opening, the bait dispenser enabling retrieval of filtered bait.

2. The portable fishing bait case of claim 1, wherein the bait screen includes a first horizontal portion, a vertical portion extending upwardly from a rear of the first horizontal portion and perpendicular thereto, and a second horizontal portion extending rearwardly from a top of the vertical portion and perpendicular thereto, and wherein the plurality of bait apertures are disposed in each of the first horizontal portion, the vertical portion and the second horizontal portion.

3. The portable fishing bait case of claim 2, wherein the housing includes a height of 10 cm as measured from a bottom side to a top side.

4. The portable fishing bait case of claim 3, wherein the housing includes a width of between 6 cm-7 cm, as measured from the first side to the second side.

5. The portable fishing bait case of claim 4, wherein the housing includes a depth of between 2 cm-4.5 cm, as measured from an exterior surface of the front portion to an exterior surface of the rear portion.

6. The portable fishing bait case of claim 1, wherein the bait screen includes a single horizontal screen sized substantially equal to the width and the depth of the housing.

7. The portable fishing bait case of claim 5, wherein the bait screen is removable from the interior.

8. The portable fishing bait case of claim 1, wherein the door is one of a hinged door and a slidable door.

9. The portable fishing bait case of claim 8, wherein at least the front portion of the housing is substantially transparent.

10. The portable fishing bait case of claim 9, wherein the housing further includes at least one hinge pivotably connecting the front portion and the rear portion at a first side of the housing, and wherein the at least one fastener is located at a second side of the housing, the first side being opposite the second side.

11. The portable fishing bait case of claim 10, wherein the top section of the interior includes a plurality of fishing jig holders, wherein at least the front portion is divided into a top half and a bottom half, wherein the at least one hinge includes a top hinge connecting the top half to the rear portion, and a bottom hinge connecting the bottom half to the rear portion, wherein the at least one fastener includes a top fastener to selectively secure the top half to the rear portion and a bottom fastener to selectively secure the bottom half to the rear portion, and wherein the front half and the bottom half are separately openable.

12. A portable fishing bait case comprising:
   a housing including a front portion and a rear portion defining an interior, and at least one fastener to selectively secure the front portion and the rear portion together, at least the front portion of the housing being substantially transparent;
   a bait screen located within the interior of the housing and separating the interior into generally a top section and a bottom section, the bait screen including a first horizontal portion, a vertical portion extending upwardly from a rear of the first horizontal portion and perpendicular thereto, a second horizontal portion extending rearwardly from a top of the vertical portion and perpendicular thereto, and a plurality of bait apertures disposed in each of the first horizontal portion, the vertical portion and the second horizontal portion, the plurality of bait apertures sized to allow bait to pass therethrough whilst substantially preventing bedding material from passing therethrough, thereby causing the bait to separate from the bedding material and filter from the top section to the bottom section of the interior;
   a bait dispenser disposed in one of the front portion and the rear portion toward a bottom of the housing, the bait dispenser including an opening providing access into the bottom section of the interior, and a door selectively covering the opening, the bait dispenser enabling retrieval of filtered bait.

13. The portable fishing bait case of claim 12, wherein the door is one of a slidable door and a hinged door.

14. The portable fishing bait case of claim 13, wherein the housing further includes at least one hinge pivotably connecting the front portion and the rear portion at a first side of the housing, and wherein the at least one fastener is located at a second side of the housing, the first side being opposite the second side.

15. The portable fishing bait case of claim 14, wherein the top section of the interior includes a plurality of fishing jig holders, wherein at least the front portion is divided into a top half and a bottom half, wherein the at least one hinge includes a top hinge connecting the top half to the rear portion, and a bottom hinge connecting the bottom half to the rear portion, wherein the at least one fastener includes a top fastener to selectively secure the top half to the rear portion and a bottom fastener to selectively secure the bottom half to the rear portion, and wherein the front half and the bottom half are separately openable.

16. A portable fishing bait case comprising:
   a housing including a front portion and a rear portion defining an interior, and at least one fastener to selectively secure the front portion and the rear portion together, at least the front portion of the housing being substantially transparent;
   a bait screen located within the interior of the housing and separating the interior into generally a top section and a bottom section, the bait screen including a single horizontal screen and a plurality of bait apertures disposed therein, the single horizontal screen sized substantially equal to a width and a depth of the housing, the plurality of bait apertures sized to allow bait to pass therethrough whilst substantially preventing bedding material from passing therethrough, thereby causing the bait to separate from the bedding material and filter from the top section to the bottom section of the interior;

a bait dispenser disposed in one of the front portion and the rear portion toward a bottom of the housing, the bait dispenser including an opening providing access into the bottom section of the interior, and a door selectively covering the opening, the bait dispenser enabling retrieval of filtered bait.

17. The portable fishing bait case of claim 16, wherein the bait screen is removable from the interior.

18. The portable fishing bait case of claim 17, wherein the door is one of a slidable door and a hinged door.

19. The portable fishing bait case of claim 18, wherein the housing further includes at least one hinge pivotably connecting the front portion and the rear portion at a first side of the housing, and wherein the at least one fastener is located at a second side of the housing, the first side being opposite the second side.

20. The portable fishing bait case of claim 19, wherein the top section of the interior includes a plurality of fishing jig holders, wherein at least the front portion is divided into a top half and a bottom half, wherein the at least one hinge includes a top hinge connecting the top half to the rear portion, and a bottom hinge connecting the bottom half to the rear portion, wherein the at least one fastener includes a first fastener to selectively secure the top half to the rear portion and a second fastener to selectively secure the bottom half to the rear portion, and wherein the front half and the bottom half are separately openable.

\* \* \* \* \*